UNITED STATES PATENT OFFICE.

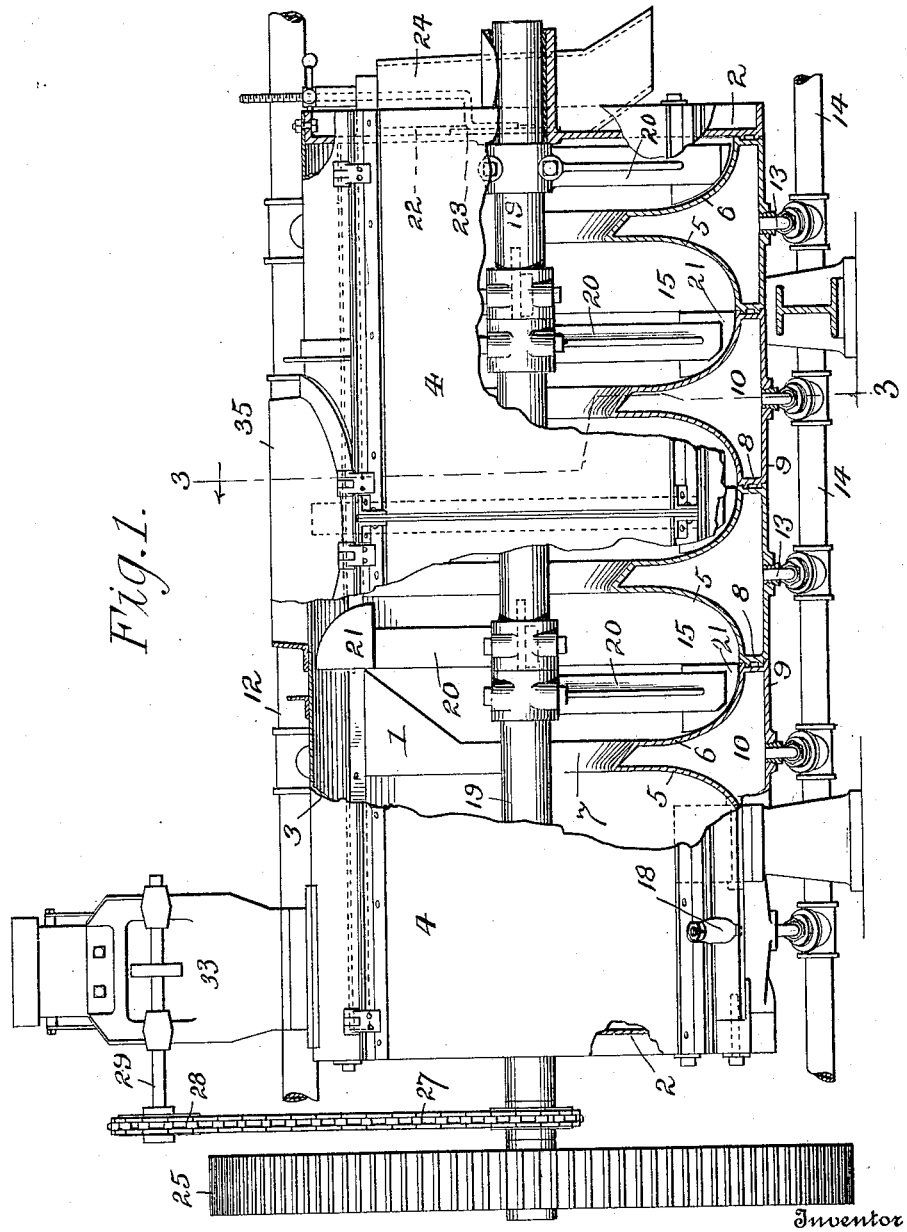

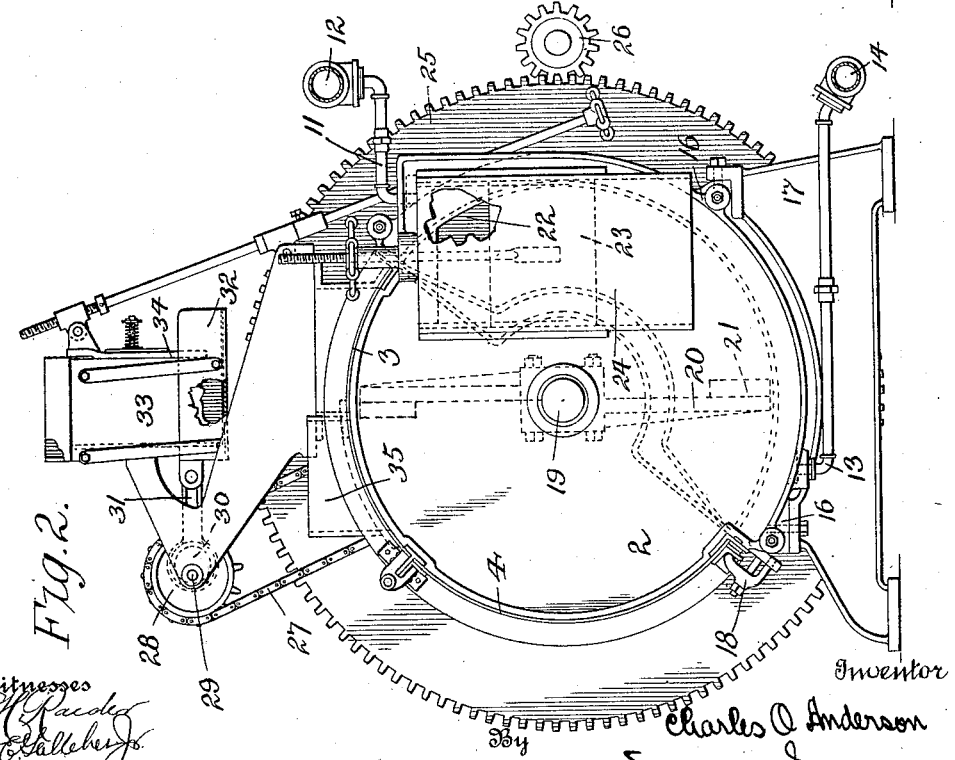

CHARLES O. ANDERSON, OF CLEVELAND, OHIO.

DRIER, TEMPERING-HEATER, AND COOKER.

1,132,422.  Specification of Letters Patent.  Patented Mar. 16, 1915.

Application filed July 8, 1914. Serial No. 849,821.

*To all whom it may concern:*

Be it known that I, CHARLES O. ANDERSON, a citizen of the United States, residing at Cleveland, in the county of Cuyahoga and State of Ohio, have invented certain new and useful Improvements in Driers, Tempering-Heaters, and Cookers, of which the following is a specification.

My present invention pertains to improvements in driers, tempering heaters and cookers, more particularly those which are adapted to handle such materials as corn, cotton seed, brewers' grain, cotton-seed meats and the like. The apparatus is especially suitable for use in connection with material which is to be subjected to heat for a considerable period of time, and in its simplest form is shown in the annexed drawings, wherein:

Figure 1 is a longitudinal sectional elevation of the apparatus; Fig. 2 an elevation of the discharge end of the same, parts being broken away; and Fig. 3 a vertical sectional view, taken on the line 3—3 of Fig. 1, and looking toward the feed end of the machine.

The main object of the invention is to provide a readily formed and sectional apparatus for drying wet material wherein the same will be subjected to a relatively long period of drying and caused to pass gradually from the feed end of the machine to the discharge end thereof, the feed and discharge being continuous after the apparatus is once loaded. The apparatus is also applicable for the purpose of cooking, and particularly for cooking cotton-seed meats preparatory to placing them in a hydraulic press.

The invention is in a sense an improvement upon the apparatus set forth in the application filed in the name of Frank B. Anderson under date of July 8, 1914, Serial No. 849,822.

Under the present construction it is designed to produce a trough from a number of similar units, which may be readily formed and easily assembled and the machine lengthened out or shortened up, as may be required, by merely including or removing certain of the sections.

A further object of the construction is to so form the sections of the apparatus as to produce a series of pockets or the like between which the stirrers or agitators work, and over the walls of which the material is fed from the intake to the discharge end of the apparatus.

The main body of the structure may be said to comprise a series of sections or castings 1, all alike in form, and a head 2 at the feed end and the discharge end of the machine, which heads and sections, together with a fixed cover plate or member 3 and hinged sections or doors 4, produce a trough through which the material is traversed. The sections 1, when viewed from the end or in cross-section, are substantially crescent-shaped in form, the side walls 5 and 6 converging toward each other at their upper sides and preferably formed with an inclined discharge face 7, the inclination being toward the discharge end of the apparatus. The walls 5 and 6 extend upwardly from short vertically-disposed walls 8, which in turn are formed integrally with the outer wall 9, said walls forming a space or chamber 10 into which the heating medium may be introduced through a pipe, as 11, connected with a manifold 12. A pipe 13 extends from the lower end of the chamber 10 and connects with a manifold or main 14. Thus each section is hollow and the converging walls of the adjacent sections form pockets, as 15, or in other words, there is produced a series of inclined pockets in the apparatus which are separated by a series of upstanding hollow heated walls, the pockets occupying a position in the bottom and rear side of the structure.

The various sections are provided with lugs 16, disposed around the same, and tie-bolts are passed therethrough, and through corresponding members upon the heads, so that the sections will be drawn tightly together and a close union effected between the heads and the adjacent walls 8 of the various sections. The structure thus built up will preferably be secured upon pedestals 17, as best shown in Figs. 2 and 3.

Normally and while the machine is in operation the doors are designed to be kept closed, and to this end clamps 18 are employed.

Extending through and journaled in the heads is a shaft 19, and mounted upon said shaft are a series of arms 20, each arm carrying at its outer end a paddle or blade 21, one end of which is curved to conform to the curvature of the adjacent wall 5 or 6, as the case may be, and preferably a pair of such arms and blades (which may be termed stirrers or agitators) are secured upon the shaft so that there will be two such stirrers working in each pocket 15. At the discharge end of the machine the pocket has but half the dimensions of the intermediate pockets, and consequently but one stirrer is shown therein.

The head 2 at the discharge end of the machine is provided with an opening 22, Figs. 1 and 2, said opening being formed at one side of the center. An adjustable gate 23 moves over said opening and controls the discharge of the material from the machine, the material flowing over the upper edge of the gate and into a spout 24.

The shaft 19 is driven by means of a large gear wheel 25, which receives its power from a pinion 26. The shaft also carriers a sprocket wheel about which passes a sprocket chain 27, said chain imparting motion to a sprocket wheel 28, mounted upon a shaft 29. Said shaft carries an eccentric 30, Fig. 2, which in turn actuates a pitman 31, connected to the swinging bottom 32 of a feed device. The hopper of such device is denoted by 33, and is provided at one side with an adjustable gate 34, so that the amount of material which is fed from the hopper and discharged into the machine may be regulated as desired. This is a well-known form of feed mechanism, but any other construction may be substituted therefor.

The member 3 will preferably be provided with an off-take pipe 35, through which the steam or other vapors driven off from the material will be withdrawn.

The operation of the apparatus is substantially as follows: The machine being set in operation and the heat being supplied to the chambers 10 of the various sections 1, material is fed in at the feed end of the machine and will be distributed throughout the apparatus through the action of the agitators. In other words, the material will seek its own level, and be evenly distributed throughout the machine until it reaches a height equal to that of the upper edge of the discharge gate, when it will flow over said gate and out through the spout 24 as fast as it is fed into the machine by the feed mechanism. Being constantly agitated and stirred, it comes into contact with the heated surface of the various sections, and the heated material is commingled with the wet material and thereby the water is driven off and passes out through the pipe 35. Being constantly moved into contact with the heated surface and intermixed or intermingled throughout the machine, the material becomes thoroughly dry and a relatively small apparatus may be used as compared with a structure in which the material is merely fed through the machine in contact with a heated surface. The material, owing to the action of the agitators, will assume an angle of repose in the apparatus substantially in line with the upper end of the sections 1, or in other words, will come to repose at the angle indicated by the lines A—A in Fig. 3. Should it be desired to discharge the apparatus quickly, this may be readily accomplished by throwing the doors 4 upwardly, and reversing the direction of movement of the agitators, which will then sweep the material from the inclined pockets, the tendency of the material to gravitate contributing to the ready discharge thereof.

Having thus described my invention, what I claim is:

1. In an apparatus of the character described, the combination of a plurality of hollow members; means for securing the same together; a head arranged at each end of the series and thereby forming a trough-shaped structure; a plurality of agitators working therein; means for introducing a heating medium into said hollow members; means for feeding material into said trough-shaped structure at one end; and a regulable discharge opening at the opposite end.

2. In an apparatus of the character described, a trough-shaped structure composed of a series of hollow sections secured together; a closure for the upper portion thereof; a series of agitators working in the trough; and means for feeding material to be treated into one end of the trough, said trough having a discharge opening at the opposite end thereof.

3. In an apparatus of the character described, the combination of a trough-shaped member having a series of pockets formed in the lower portion thereof; means for heating the same; a plurality of agitators working in said pockets; and means for feeding in the material to be treated into one end of the trough, said trough having an elevated discharge opening at its opposite end.

4. In an apparatus of the character described, the combination of a trough-shaped member having a series of pockets formed in the lower portion thereof; means for heating the same; a plurality of agitators working in said trough-shaped member; and means for feeding the material to be treated into one end of the trough, said trough having an elevated discharge opening at the opposite end thereof.

5. In an apparatus of the character described, the combination of a plurality of hollow crescent-shaped members; a pair of heads; means for securing said heads and members together to form a trough; a closure for the upper portion of the structure; means for heating said hollow members; a plurality of agitators working over said members; and means for feeding material to be treated to said trough at one end, said trough having a discharge opening at its opposite end.

6. In an apparatus of the character described, the combination of a plurality of hollow members, each being substantially crescent-shaped in side elevation, with the side walls thereof converging toward the upper edge; a pair of heads; means for securing said heads and members together and thereby producing a trough-like structure with a series of pockets therein; means for closing the upper portion of the structure; means for heating the hollow members; a plurality of agitators working in the pockets; means for feeding material into one end of the structure; and an adjustable discharge gate located at the opposite end of the structure.

7. In an apparatus of the character described, the combination of a plurality of hollow members each being substantially crescent-shaped in side elevation and the side walls thereof converging toward the upper edge; a pair of heads; means for securing said heads and members together and thereby producing a trough-like structure with a series of pockets therein; means for closing the upper portion of the structure; means for heating the hollow members; a shaft extending throughout the length of the structure; a plurality of arms secured to said shaft; a paddle secured to the outer end of each arm, the edge of said paddle being so shaped as to conform to the contour of the adjacent wall of a hollow member; means for feeding material into one end of said trough-shaped structure; and an adjustable gate mounted at the opposite end of said structure.

8. In an apparatus of the character specified, the combination of a trough-shaped member composed of a series of upwardly inclined pockets arranged side by side; and a closure for the structure arranged opposite the open side of the pockets; a feed opening arranged at one end of the apparatus; an elevated discharge opening at the opposite end; and a series of agitators sweeping through the pockets at substantially right angles to the path of movement of the material through the apparatus.

9. In an apparatus of the character specified, the combination of a series of upwardly-inclined pockets arranged side by side and transversely of the apparatus; stirrers working in said pockets; and a removable closure placed opposite the open sides of the pockets, whereby when the closure is opened the material being treated may be freely discharged from said inclined pockets by the stirrers.

10. In an apparatus of the character specified, the combination of a series of pockets arranged side by side transversely of the apparatus, the pockets lying in an inclined plane; a closure arranged opposite said pockets, whereby a trough-shaped member is produced; a feed opening at one end; an elevated discharge opening at the opposite end; and a series of agitators working in said pockets transversely to the longitudinal axis of the trough.

11. In an apparatus of the character specified, the combination of a trough having a series of upwardly-inclined pockets arranged side by side and extending transversely of the apparatus; a feed opening arranged at one end of the apparatus; an elevated discharge opening at the opposite end thereof; and a series of agitators working in said pockets and moving transversely of the longitudinal axis of the apparatus.

In testimony whereof I have signed my name to this specification in the presence of two subscribing witnesses.

CHARLES O. ANDERSON.

Witnesses:
CHAS. J. FONTANA,
M. E. HARRINGTON.

Copies of this patent may be obtained for five cents each, by addressing the "Commissioner of Patents, Washington, D. C."